(12) United States Patent
Orologio

(10) Patent No.: US 6,322,873 B1
(45) Date of Patent: Nov. 27, 2001

(54) FIRE RETARDANT CAVITY FILLED INSULATION PACK

(76) Inventor: Furio Orologio, 10 Dansk Court, Unit 6, Etobicoke, Ontario (CA), M9W 5T8

(*) Notice: Subject to any disclaimer, the term of this patent is extended or adjusted under 35 U.S.C. 154(b) by 0 days.

(21) Appl. No.: 09/397,861

(22) Filed: Sep. 17, 1999

(30) Foreign Application Priority Data

Sep. 17, 1999 (CA) .................................................. 2282967

(51) Int. Cl.⁷ .............................. B32B 1/00; B32B 31/00; B27N 9/00
(52) U.S. Cl. ............................ 428/178; 428/72; 428/920; 428/921; 156/145; 156/209; 156/243; 156/292; 156/285; 156/322
(58) Field of Search ................................ 428/72, 76, 178, 428/913, 920, 921; 156/145, 209, 242, 243, 285, 292, 308.4, 309.9, 322

(56) References Cited

U.S. PATENT DOCUMENTS 3,813,279 * 5/1974 Varner .................................. 428/178

* cited by examiner

Primary Examiner—Donald J. Loney
(74) Attorney, Agent, or Firm—Manelli Denison & Selter; Edward J. Stemberger

(57) ABSTRACT

A thermally insulating bubble pack for use in framed structures, walls, crawl spaces and the like; or wrapping for cold water heaters, pipes and the like wherein the bubbles contain a fire retardant material. The improved bubble pack comprises a first film having a plurality of portions wherein each of the portions defines a cavity; a second film in sealed engagement with the first film to provide a plurality of closed cavities; the improvement comprising wherein the cavities contain a fluid or solid material. The flame retardant-containing bubble pack provides improved fire ratings, flame spread indices and smoke development numbers.

13 Claims, 3 Drawing Sheets

FIRE RETARDANT CAVITY FILLED INSULATION PACK

FIELD OF THE INVENTION

This invention relates to bubble-pack thermal insulation materials for use in framed structures, walls, crawl spaces and the like or wrapping for hot and cold water heaters, pipes and the like wherein the bubbles contain a fire retardant material.

BACKGROUND TO THE INVENTION

Insulation materials are known which comprise a clean, non-toxic, heat barrier made of aluminum foil bonded to a single or double layer of polyethylene-formed bubbles spaced one bubble from another bubble in the so-called "bubble-pack" arrangement. Such non-foil bubble-packs are used extensively as packaging material, whereas the metal foil bubble-pack is used as thermal insulation in wood frame structures, walls, attics, crawl spaces, basements and the like and as wrapping for hot water heaters, hot and cold water pipes, air ducts and the like. The reflective surface of the metal, particularly, aluminum foil enhances the thermal insulation of the air-containing bubble pack.

Organic polymers, such as polyethylene, are generally considered to be high- heat-release materials. They can easily initiate or propagate fires because, on exposure to heat, they undergo thermal degradation to volatile combustible products. If the concentration of the degradation products in the air is within flammability limits, they can ignite either spontaneously, if their temperature is large enough, or by the effect of an ignition source such as a spark or flame. The ignition of polyethylene can be delayed and/or the rate of its combustion decreased by means of fire retardant materials.

The ultimate aim of fire retardants is to reduce the heat transferred to the polymer below its limit for self-sustained combustion or below the critical level for flame stability. This can be achieved by decreasing the rate of chemical and/or physical processes taking place in one or more of the steps of the burning process. One or a combination of the following can achieve fire extinguishing:

1. creation of a heat sink by using a compound that decomposes in a highly endothermic reaction giving non-combustible volatile products, which perform a blanketing action in the flame, e.g., aluminum or magnesium hydroxide;
2. enhancements of loss of heat and material from the surface of the burning polymer by melt dripping, e.g., mixture of halogenated compounds with free radical initiators;
3. flame poisoning by evolution of chemical species that scavenge H and OH radicals which are the most active in propagating thermo-oxidation in the flame, e.g., hydrogen halides, metal halides, phosphorus-containing moieties;
4. limitation of heat and mass transfer across the phase boundary, between thermal oxidation and thermal degradation by creation of an insulating charred layer on the surface of the burning polymer, e.g., intumescent chart; or
5. modification of the rate of thermal volatilization of the polymer to decrease the flammability of the volatile products; which approach strongly depends on the chemical nature of the polymer.

Fire retardant materials are generally introduced to the polyethylene as merely additives or as chemicals that will permanently modify its molecular structure. The additive approach is more commonly used because it is more flexible and of general application.

Generally, low density polyethylene films of 1–12 mil, optionally, with various amounts of linear low density polyethylene in admixture when additional strength is required, are used for the above applications. The insulating properties of the bubble pack primarily arise from the air in the voids. Typically, bubble diameters of 1.25 cm, 0.60 cm and 0.45 cm are present.

Regardless of the application method of fire retardant material(s), a satisfactory insulative assembly must have a fire rating of Class A with a flame spread index lower than 16, and a smoke development number smaller than 23. Further, the bonding of the organic polymer films and their aging characteristics must meet the aforesaid acceptable standards. Yet further, the fabrication method(s) of a new fire retardant system or assembly should be similar to the existing technology with reasonable and cost effective modifications to the existing fabrication system/technology. Still yet further, other physical properties of an improved fire standard system must at least meet, for example, the standard mechanical properties for duct materials as seen by existing competitive products.

Fire retardant polyethylene films, wires and cables containing a fire retardant material in admixture with the polyethylene per se are known which satisfy cost criteria and vigorous fire retardant technical standards to be commercially acceptable. However, it has been found that forming a bubble pack comprising such a film results in a poor bonding between the cavity-containing layer and the adjacent sealing layer used to cover the cavities to form the bubbles. Delamination of these layers, particularly, after installation constitutes a significant problem.

Conventional fire retardant additives are usually compounds of small molecular weights containing phosphorus, antimony, or halogens. The most effective commercially available fire retardant systems are based on halogen-containing compounds. However, due to concerns over the environmental effects of such halogenated compounds, there is an international demand to control the use of such halogenated additives.

Some of the most common halogenated agents are methyl bromide, methyl iodide, bromochlorodifluoromethane, dibromotetrafluoroethane, dibromodifluoromethane and carbon tetrachloride. These halogenated fire retarding materials are usually available commercially in the form of gases or liquids. Unlike chlorine and bromine, fluorine reduces the toxicity of the material and imparts stability to the compound. However, chlorine and bromine have a higher degree of fire extinguishing effectiveness and, accordingly, a combination of fluorine and either chlorine or bromine is usually chosen to obtain an effective fire-retarding compounds.

Other commercially available fire retardant materials that do not include halogens include boric acid and borate based compounds, monoammonium phosphonate, and urea-potassium bicarbonate.

Intumescent compounds which limit the heat and mass transfer by creating an insulating charred layer on the surface of the burning polymer are also considered fire retardant materials. A typical intumescent additive is a mixture of ammonium polyphosphate and pentaerythritol.

Fire retardant additives are often used with organic polymer/resins. Typically, a brominated or chlorinated organic compound is added to the polymer in admixture with a metal oxide such as antimony oxide. Halogenated compounds are also sometimes introduced into the polymer chain by co-polymerization. Low levels i.e. less than 1% W/W are recommended to make adverse effects of halogen-based systems negligible. Another common fire retardant additive is diglycidyl ether of bisphenol-A with $MoO_3$. Other additives to improve the fire retarding properties of polyethylene include, for example, beta-cyclodextrin, magnesium hydroxide and alumina trihydrate, tin oxide, zinc hydroxystannate, and chlorosulphonated polyethylene.

A problem found with commercially available fire retardant polyethylene films, i.e. films comprising a fire retardant dispersed throughout the body of the film is that the fire retardant, generally, selected from the oxides of antimony, alumina trihydrate or magnesium hydroxide tend to migrate to and leach out of the film surface during the service life of the film and this constitutes an unsatisfactory aging characteristic. Further, because of the presence of the fire retardant at or adjacent to the film surface, heat sealing of multiple films together is also unsatisfactory. The unfavourable aging and heat sealing characteristics are a function proportional to the amount of additive in the film.

There is, therefore, a need for a thermal insulation system having improved fire retardant properties.

SUMMARY OF THE INVENTION

Surprisingly, I have found that the fire-retardant assemblies according to the invention have satisfactorily met the dual requirements of acceptable aging properties and bonding strengths, i.e. delamination.

It is one object of the present invention to provide a thermal insulation system for residential and commercial establishments having improved fire retardant properties.

Accordingly, in one aspect the invention provides an improved bubble pack comprising a first thermoplastic film having a plurality of portions wherein each of said portions define a cavity; a second thermoplastic film in sealed engagement with said first film to provide a plurality of closed said cavities; the improvement comprising wherein said cavities contain a fluid or solid fire retardant material.

The terms "cavity" or "cavities" in this specification include voids, bubbles or other like closed spaces. The cavities may be formed of any desired suitable shapes. For example, semi-cylindrical, oblong or rectangular. However, a generally, hemi-spherical shape is preferred.

The bubble pack preferably comprises the cavities being wholly or partially filled with a fire-retardant solid compound or composition.

The thermoplastic films may be formed of any suitable polymer or copolymer material. The first and second film may be formed of the same or different material. Most preferably, the bubble pack has each of the films formed of a polyethylene.

The fire retardant material may be a compound or composition comprising one or more compounds having acceptable fire retardant properties in the form of, for example, a gaseous, liquid or gel fluid contained within the cavity; solid in the form of a particulate powder or dust within the bubble or coating upon the cavity wall.

The amount of fire retardant material is such as to provide an efficacious amount in relation to the amount of plastic and other components present in the bubble pack. Thus, the amount of fire retardant material required will depend on the application of the assembly, the type and effectiveness of the fire retardant material used, the final properties required e.g. flame spread index, slow burning or self-extinguishing, and the bubble size. The fire retardant is generally present in an amount selected from 0.1–70% W/W, more preferably, 10–60% WJW, preferably 20–50%/o W/W in relation to the thermoplastic film.

Examples of suitable fire retardants of use in the practice of the invention, include those classes and compounds as hereinbefore described. Preferably, the fire retardant compound is selected from alumina trihydrate (ATH, hydrated aluminum oxide, $Al_2O_3 \cdot 3H_2O$), oxides of antimony, decabromodiphenyl oxide and mixtures of these compounds, optionally with a dimethyl siloxane fluid (DC200).

Most preferably, the bubble pack further comprises one or more foils, layers, films, laminates or the like of a suitable metal, for example, aluminum to enhance reflection of infra-red radiation and lamination of the first and second films in the manufacturing process as hereinafter described.

Thus, a most preferred plastic is polyethylene, particularly a low-density polyethylene, optionally, in admixture with a linear low density polyethylene of use as aforesaid first and second films.

The number, size and layout of the bubbles in the pack according to the invention may be readily selected, determined and manufactured by the skilled artisan. Typically, in a single pack, the bubbles are arrayed in a coplanar off-set arrangement. Each of the hemi-spherical bubbles may be of any suitable diameter and height protruding out of the plane of the bonded films. Typically, the bubble has a diameter selected from 0.5 cm –5 cm, preferably 0.8–1.5 cm; and a height selected from 0.2 cm –1 cm, preferably 0.4–0.6 cm. A preferred bubble pack has an array of about 400 bubbles per 900 $cm^2$.

BRIEF DESCRIPTION OF THE DRAWINGS

In order that the invention may be better understood, preferred embodiments will now be described by way of example only, with reference to the accompanying drawings, wherein.

DETAILED DESCRIPTION OF PREFERRED EMBODIMENTS

Figure 1:
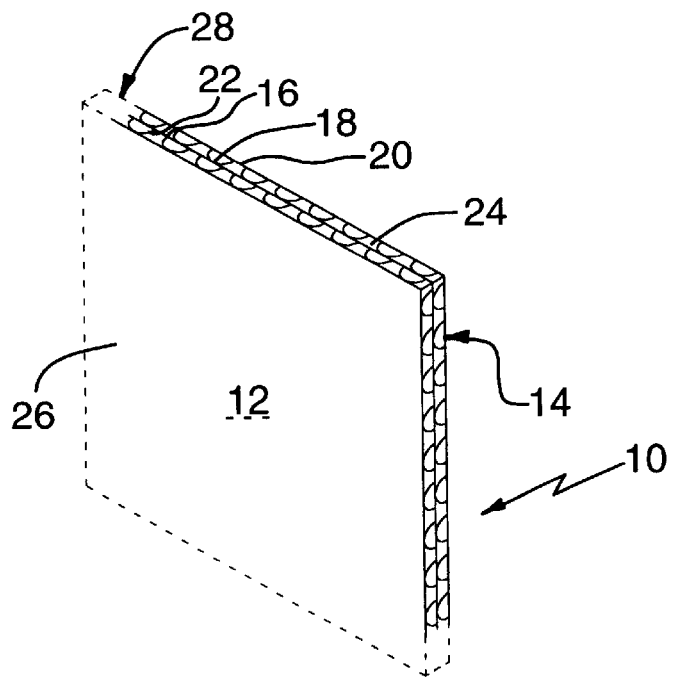
FIG. 1 is an isometric view of a wall insulation panel comprising a bubble-pack assembly according to the prior art.

With reference to FIG. 1, this shows generally as 10, a prior art double layer, bubble-pack insulation assembly. The double layer consists of a pair of bubble arrays 12, 14 bonded together through an intervening low density polyethylene film 16. Arrays 12, 14 are formed of a plurality of bubbles or sealed cavities 18, 20, respectively, from a 5 mil polyethylene film 22, 24, respectively. Each of films 22, 24 is bonded to a reflective aluminum foil 26, 28, respectively.

Assembly 10 has approximately 20, 1 cm diameter, 0.5 cm high bubbles per 30 cm length and breadth within each of films 22, 24.

The aforesaid assembly 10 is made by a double hot roller thermal and vacuum forming process for cavity forming and lamination sealing techniques known in the art, and has a fire rating of Class A/Class 1, a flame spread index of 16 and a smoke development number of 23. However, improvements in these ratings are required for new applications such as, for example, thermal insulation for heating and ventilation ducts.

Figure 2:
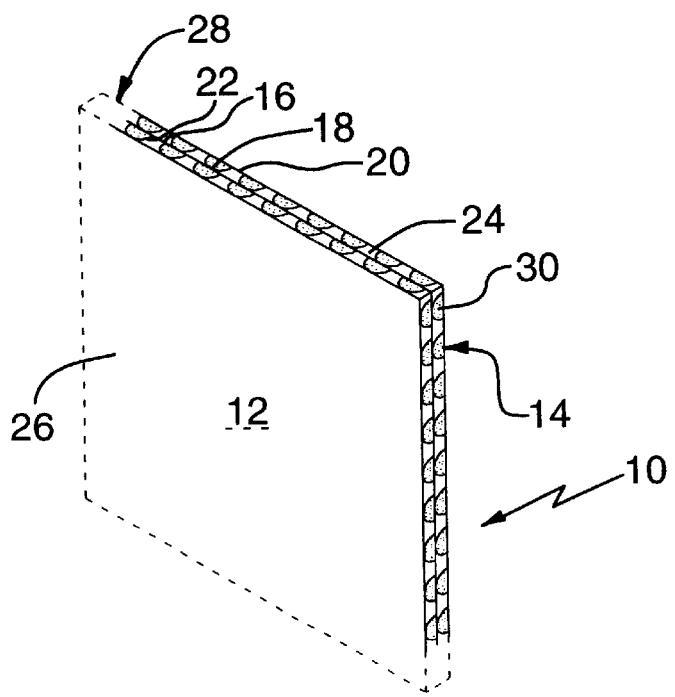
FIG. 2 is an isometric view of a wall insulation panel comprising a bubble-pack assembly according to the invention.

FIG. 2 shows the embodiment described with reference to FIG. 1 but wherein each bubble 18, 20 contains 5% WIW aluminum hydroxide fire-retardant 30 relative to the amount of low density polyethylene resin.

The aluminum hydroxide fire retardant 30 may be added to cavities 18, 20 by any suitable manual or automated method. In alternative embodiments, alternative retardants may be added by gas or liquid fluid injection or as a poured or blown particulate solid insertion method.

Figure 3:
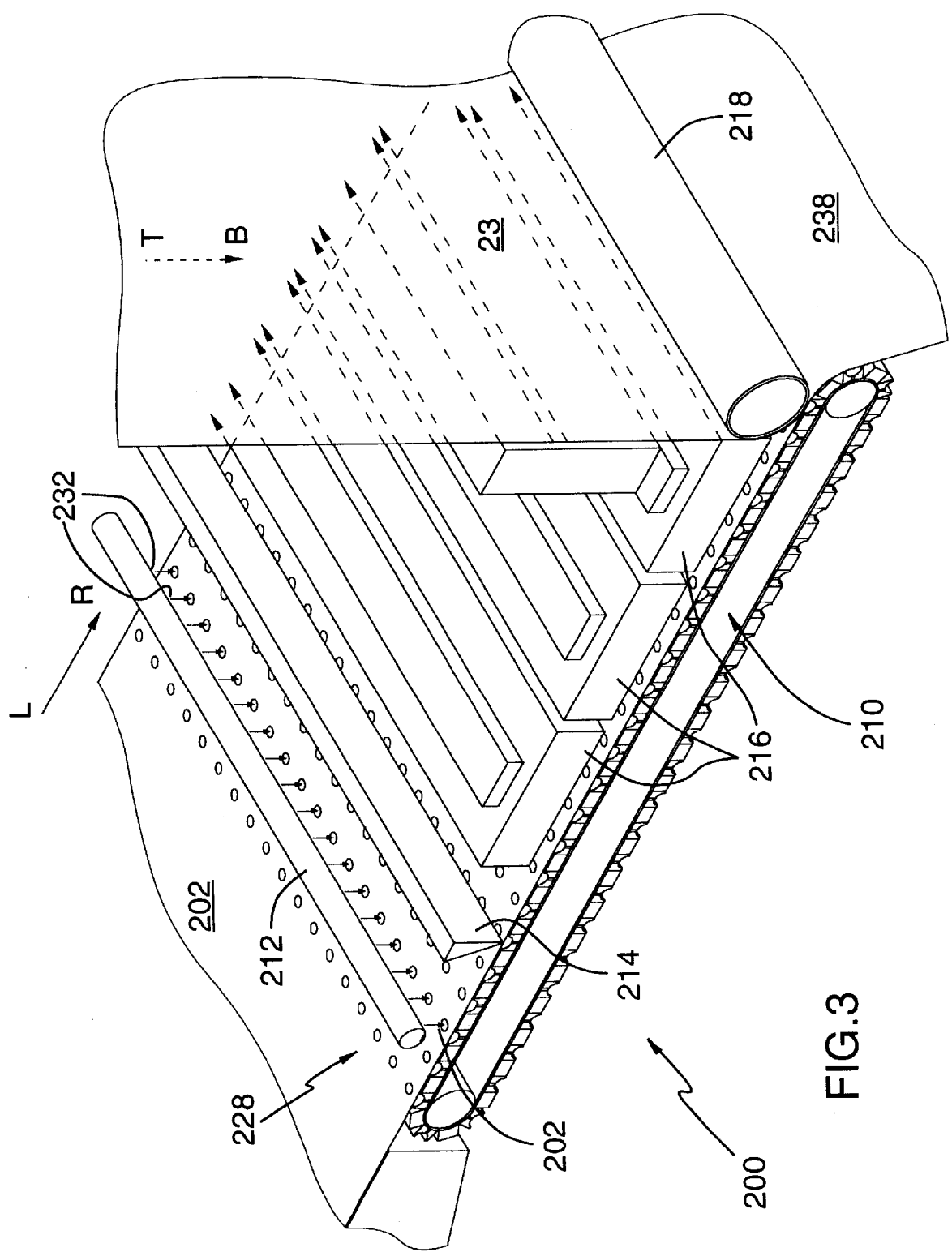
FIG. 3 is a diagrammatic, isometric view, in part, of a bubble pack-forming apparatus according to the invention.
Figure 4:
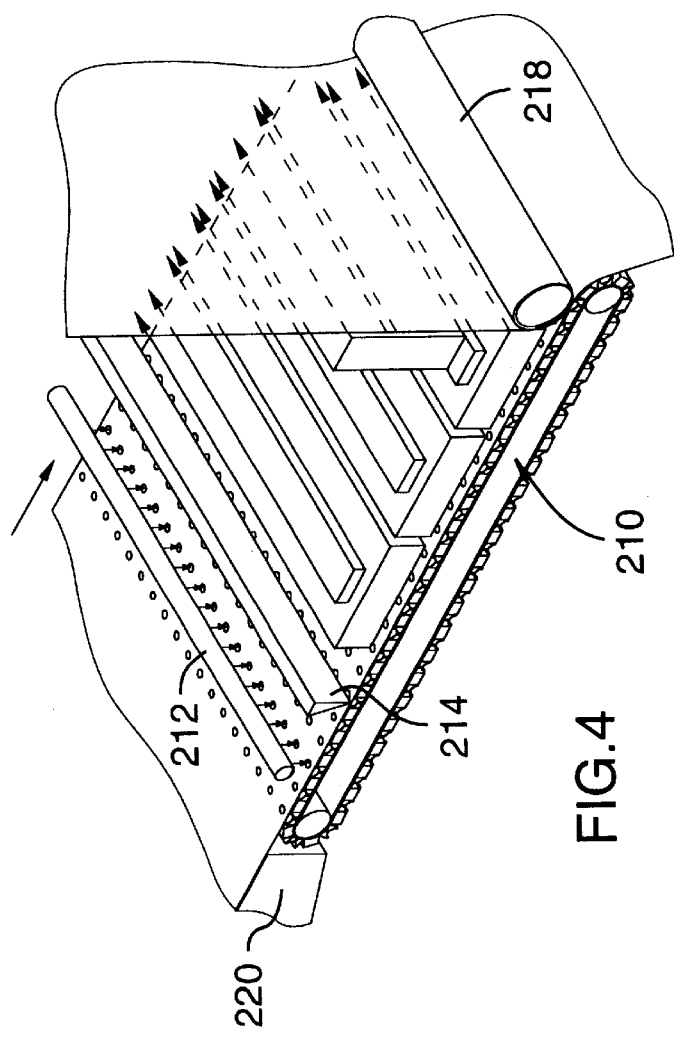
FIG. 4 is a modified version of the apparatus of FIG. 3 having enlarged diagrammatic cross-sectional views shown as FIGS. 4A and 4B; and wherein the same numerals denote like parts.
Figure 4B:
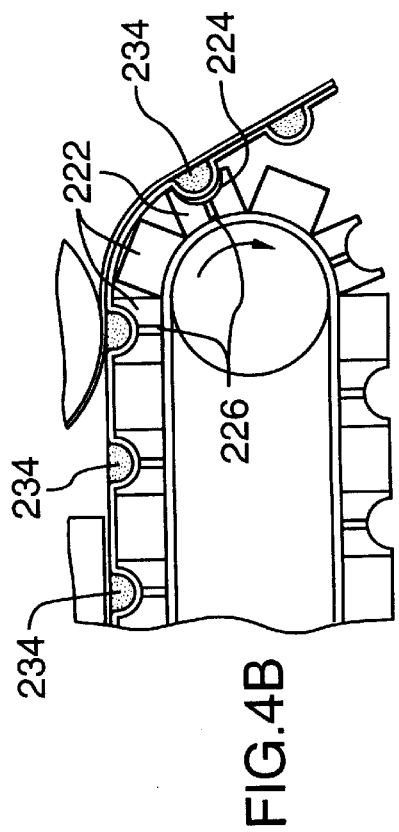
Figure 4A:
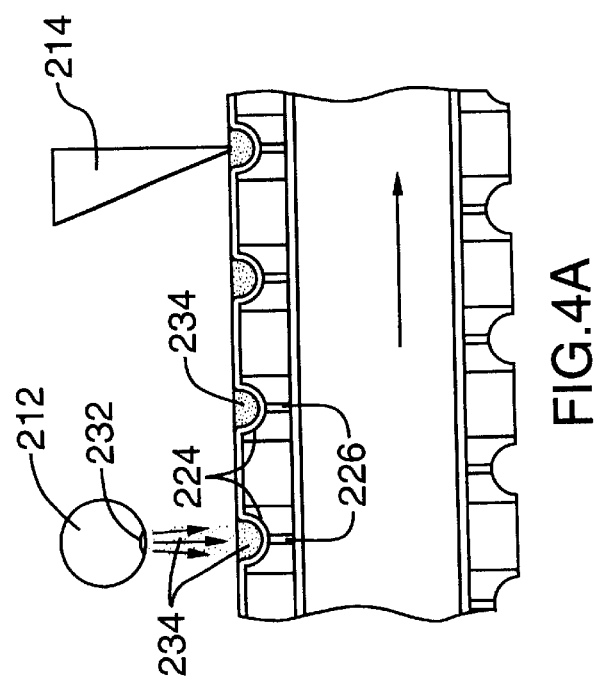

The apparatus shown in FIG. 3, generally as 200, has an endless belt conveyer mold shown generally as 210 with which a film of thermoplastics material 202 operably moves in the direction L-R of the arrow under the influence of a sprayer or dispenser 212, scraper 214, heaters 216 and nip roller 218, further described hereinbelow.

A pre-heater 220 at a suitable temperature disposed below film 202 softens film 202 to just below its melt temperature of, for example, 136–140° C. for polyethylene.

Mold 210 has an endless belt of segmented aluminum elongate members 222 movable by means of terminal rotating cog and sprocket assemblies (not shown). Each of members 222 has portions defining semi-spherical cavities 224 intermittent along the width of member 222 and offset to adjacent cavities 222 on adjacent members 222. Each of cavities 222 has an aperture 226 to provide a suctional force on the soft film for the film to be pulled onto the inside cavity surface, by a vacuum pump (not shown). Disposed above softened film 202 adjacent the feed end 228 of apparatus 200, is an elongated feed conduit sprayer 212 having a plurality of exit apertures 232 which direct filler material 234 in the form of particulate solid, e.g. powder, or liquid, gel, emulsion into each cavity 222. Although the spraying of material 234 may be suitably mechanically or electronically controlled to dispense material 234 only wherein a cavity 222 is directly beneath an individual aperture 232, I have found that sufficient resultant adhesion between film 202 and covering film 236, subsequently bonded to film 202, as hereinafter described, can be obtained by means of scraper 214 horizontally, diagonally disposed on film 202 to scrape off excess material.

Heater system 216 disposed above cavity-filled film 202 maintains the softness of film 202 in addition to softening film 236 fed in arrow direction T-B prior to its melding and bonding with film 202 under nip roller 218 to form cavity-filled bubble pack film 238.

The size, shape and arrangement of the cavities in the film may be as suitably determined by the skilled person. The temperatures of films 202, 236 as well as film throughput rate can be readily selected by the skilled person. Throughput rates of the magnitude of 50 meters/minute are preferred.

Experimental

General

Fire retardant bubble packs were formed consisting of a lower bubbled-polyethylene film, an upper flat polyethylene film and a fire retardant chemical placed in the bubble cavities of the lower film. The pack was formed by hot pressing. Peel tests used a modified ASTM D902 method and flame retardant tests were based on 1 ED Method 707.

The samples were subsequently exposed to aging tests simulating twenty years service.

Similar tests were also performed on heat bonded films having fire retardant deliberately put between the films prior to hot pressing.

Two polyethylene films of different thickness were used as base films. A bubble film with an original thickness of 6 mil, and a plain/flat film with a thickness of 3 mil were used. A 1.25 mm thick, aluminum plate/mold having a surface area of 32 cm×32 cm was used for the bonding (hot pressing) tests of the polyethylene films. A rubber-dimpled plate (0.6 cm thick) was secured on top of the aluminum plate having dimples so sized as to support the bubbled polyethylene film supplied. The rubber provided a non-stick surface to the polyethylene films during hot pressing.

The hot press consisted of two plates that were independently heated to a controlled temperature and pressed together by a hydraulic press with the applied load measured by a pressure gauge. To calculate the applied pressure, the measured load is divided by the surface area of the plate. The temperature of each of the plates was measured by a thermocouple. However, for the purpose of these tests, only the top plate was heated.

Several tests were made to determine the optimum pressure, time and temperature for the bonding of the polyethylene films, each of a surface area of 32 cm×32 cm. A bubbled 6 mil film was secured in the dimpled plate and a 3 mil film was placed on top of it. The weight of the bubbled film was 19.4 g while the weight of the flat 3 mil polyethylene film was 5.2 g. A thin Mylar sheet was then placed on top to prevent sticking of the polyethylene to the top hot plate of the hot press. The top hot plate of the hot press was then heated the required temperature and lowered onto the plate-films arrangements. The required load applied to the films was reached using the hydraulic press.

Several time-temperature tests were undertaken. The pressure was kept constant in all cases at 30 psi. Temperature below 136° C. did not produce good bonding, while temperatures above 140° C. rapidly melted the polyethylene films. Different pressing/bonding durations at 138° C. were tested at pressing periods of 1 second, 15 seconds, 30 seconds and 60 seconds. Peel tests were used to determine the effect of the hot-pressing period on the bonding of polyethylene films, using a modified ASTM D903 "Standard Test Method for Peel or Stripping Strength of Adhesive Bonds" to accommodate specimen size and specifications. Table 1 summarizes the peel strength results as a function of press time at 138° C. and 30 psi of pressure.

TABLE 1

Peel strength as a function of pressing time

| PRESS TIME (seconds) | PEEL STRENGTH (N/m) |
| --- | --- |
| 1 | 349.4 |
| 5 | 711.1 |
| 15 | 773.5 |
| 30 | 763.3 |
| 60 | 863.2 |

The results indicated that best bonding results were obtained using 60 seconds of hot pressing. The one-second hot pressing produced very poor bonding.

Peel test on the bonded polyethylene were undertaken on two different samples. Both samples, however, were manufactured from the same type of materials, i.e., a bubbled 6 mil and a flat 3 mil polyethylene sheet. The first sample had a peel strength of 552.2 N/m, while the second sample did not peel before it broke which suggests that its bonding strength is stronger than the tensile strength of its components.

The results presented above indicate that the peel strength of the manufactured insulation bonded according to the invention is of good quality and compares very well with manufactured prior art products. The bonded insulation was also tested visually as well as by attempting to press the bubbles of the bonded insulation. Visual inspection and comparison to manufactured prior art products indicated overall good bonding. By pressing on the bubbles of the bonded insulation, the bubbles broke if the bonding was good. If the bonding was weak, the air bubbles migrate into the flat space between the films. Except when using a one-second hot-pressing period, excellent bonding occurred at all other conditions examined.

In summary, best results were obtained with the following condition:

Temperature: 138° C.
Pressure: 30 psi
Duration: 60 seconds

Good peeling strength was also obtained when the hot-pressing time wae between 15 and 30 seconds. These conditions and the plain polyethylene samples obtained from these tests provided a base line for subsequent testing, comparison and analysis.

A second arrangement was also examined for bonding. This time, the 6 mil bubbled polyethylene was bonded to a 1 mil polyethylene film backed by an aluminum foil. This arrangement is the preferred arrangement for insulation applications. Bonding tests were examined by preparing samples at different hot pressing durations while keeping the temperature and pressure constant at 138° C. and 30 psi, respectively.

The results of the peel tests are shown in Table 2.

TABLE 2

Peel strength as a function of pressing time using aluminum-backed polyethylene

| PRESS TIME (seconds) | PEEL STRENGTH (N/m) |
| --- | --- |
| 15 | 734.9 |
| 30 | 1223.0 |
| 60 | 1127.0 |

Peel stengths were larger than those prepared, under the same conditions using similar two polyethylene films but without aluminum backing. This suggests that the aluminum film provides a useful and important role in improving the heat conduction throughout the sample and between the hot plate and the polyethylene films.

Bonding of Polyethylene Bubble Pack Films Containing Fire Retardant Chemical

The purpose of this test was to test the feasibility of bonding of polyethylene films filled with chemicals. In these trials, the 32 cm×32 cm film was divided into four different quadrants of 16 cm×16 cm area with each section being filled with a different chemical composition. The combinations prepared were those shown listed in LIST A.

LIST A

1. Mix #1: Antimony Trioxide—1 part (by weight) plus decabromodiphenyl ether—2 parts (20 g & 3.0 g & 1.5 g)).
2. Mix #2: Mix #1 plus 14 weight percent dimethylsiloxane (DC200) fluid (50 g & 3.0 g & 3.0 g & 1.5 g).
3. Mix #3: Mix #1 plus 14^% propylated triphenyl phosphate (Phosflex 41P) (50 g &3.0 g &3.0 g & 1.5 g & 1.5 g).
4. Mix #4: Mix #1 plus 14% butylated triphenyl phosphate plus triphenyl phosphate (Fyrquel EHC-S) (25 g).
5. Alumina trihydrate (3.25 g).
6. Calcium cabonate (3.0 g).
7. Vermiculite (3.75 g).
8. Phosflex 41P fluid (3.25 g).

The figures between brackets show the actual weight of the chemical mix placed within the 16 cm×16 cm area of polyethylene film. In some cases, this effective weight percent amount was much higher than what is generally recommended by suppliers for these materials. The results of the fire-retardant tests of these samples, therefore, provided an excellent indication of the effectiveness of each of the selected fire retardant chemicals in improving the fire retardant properties of polyethylene films.

Bonding was undertaken by hot pressing at conditions outlined hereinbefore. Visual inspection, hand peeling and bursting of bubbles of the prototypes prepared indicated all samples with powder chemicals were well-bonded. The only sample that appeared to show a weak bonding between the two layers was that containing the fire retardant fluid Phosflex 41P. This suggests that during hot pressing some of the fluid evaporated from the bubbled areas and condensed onto the flat surfaces between the polyethylene films. Since bonding of the polyethylene films required good contact between the films, the migration of the fluid to the flat surfaces prevented the required contact between the films and, thus, prevented good bonding.

To determine the effect of the dimethylsiloxane fluid used on bonding of the polyethylene, the fluid was first sprayed onto the bubbled film. The required amount of powder material was then applied on top of the sprayed fluid within the bubbles and on the flat surfaces. Hot pressing at the conditions indicated above did not produce a good bond between the films, even after repeated hot pressing. This suggests that this method of application may not be practical in making the bubble pack according to the invention.

Aluminum backed polyethylene was also bonded to bubbled films with different retardant chemicals placed within the bubbles. Examples of this system were examined for R-value and fire retardant properties and provided the preferred bubbled pack according to the invention.

Bonding of Fire Retarding Polyethyleme Films

Several tests were undertaken to bond prior art fire retardant polyethylene films. Films with two different thicknesses were used in the test, namely, 10 mil and 3 mil. Attempts to bond the two films together at the conditions specified for the polyethylene films hereinbefore described for the bubble pack of the invention were not successful. Increasing the temperature to 140° C. also did not provide the bonding required although, this time, there was some very localized but weak bonding formed between the two films. A third test was undertaken a plain bubble-film was bonded to the 3-mil, flat fire-retardent polyethylene film. The conditions for this test were also similar to those used for plain polyethylene films. This test resulted in good bonding between the two different films.

As mentioned hereinbefore, fire retarding polyethylene films because they contain compounds with relatively small molecular weights, migrate and leach out of the surface of the polymer during the service life of the polymer material or upon heating.

The results of the bonding tests of these films confirmed the inadequate bonding of these films.

Results

The following sections provide results for fire tests, peel tests, aging tests and R-value measurements.

Preliminary Fire Tests

The first experimental screening tests were fire tests on the polyethylene film bubble packs containing the compounds identified in LIST A, hereinbefore. In addition to these packs, plain polyethylene bubbled films and commercial fire-retardant polyethylene films were also subjected to the same fire testing and evaluation. The materials were exposed to 15 seconds of flame. Burn, ignition, after-burn, melting, formation of holes and the size of the holes formed were all parameters observed during and after each fire test. When a fire retardant compound was added to the polyethylene film, the fire test was undertaken twice. In the first test the flame was directed towards the bubble side while in the second test the flame was directed towards the flat side of the sample. In all cases the fire-test results from either of the two sides were similar.

The results on plain/bubbled polyethylene material showed that the material burned and ignited in less than 10 seconds. The sizes of the holes were usually larger than 40 mm. The fire retardant polyethylene films also ignited at 8–10 seconds but their burn rate was slower than that of regular polyethylene materials.

The results of the preliminary fire tests on polyethylene containing fire retardant chemicals are summarized in Table 3 for the chemicals and mixes identified in LIST A. In all the tests, the material used was 16cm×16 cm area and which was exposed to 15 seconds of flame.

TABLE 3

Summary of Preliminary Fire Tests

| MATERIAL | WEIGHT OF CHEMICAL ADDED | WEIGHT RATIO | OBSERVATIONS |
| --- | --- | --- | --- |
| Mix 1 | 20 g | 6.7 | Starts to ignite but no burn, Some small holes were formed (~7 mm diameter) |
| Mix 2 | 50 g | 16.7 | No ignition or burn; melting resulted in a 3-cm diameter hole. |
| Mix 3 | 25 g | 6.7 | No ignition or burn or any holes. |
| Mix 4 | 3.25 g | 1.1 | Starts to ignite but not burn; melting resulted in a 5-cm hole. |
| Alumina trihydrate | 3.0 g | 1.0 | No ignition, 4-cm hole with smaller holes (1 cm) in bubbles. |
| Calcium carbonate | 3.0 g | 1.0 | Burns easily. |
| Vermiculite | 3.75 g | 1.25 | Burns and ignites. |
| Phosflex 41P fluid | 3.0 g | 1.0 | Softened, small holes, no burn, oily. |
| Mix 1 | 3.0 g | 1.0 | No ignition or burn, small holes (~3 mm) |
| Mix 2 | 3.0 g | 1.0 | Melts but no burn; melt hole (6 cm). |
| Mix 3 | 3.0 g | 1.0 | Melts but no burn; melt hole (5 cm). |

These tests clearly indicated that calcium carbonate and vermiculite were not as effective in fire retarding as the other chemical/mixes. In addition, mix 4 comprising antimony trioxide, decabromodiphenyl ether, butylated triphenyl phosphate and triphenyl phosphate had one more component than mix 3 but its fire test results were not as good.

The results show that polyethylene films having mixes 1, 2, 3 and alumina trihydrate had excellent fire retardant characteristics. Further, the polyethylene bubble pack according to the invention with any of these four compositions showed excellent fire retardant properties and a self-extinguishing capability after the flame was removed.

The effect of using a lighter, i.e. thinner polyethylene bubbled material was also examined.

Mix 2 was added to an embodiment consisting of a 4 mil bubbled polyethylene sheet backed by a 3-mil flat polyethylene film. Fire tests on this combination showed that a hole formed after only 10 seconds of exposure to the flame, and the fire retarding ability appeared to be reduced compared to the thicker polyethylene film. This suggests films have a minimum thickness readily determined by the skilled person for use in fire retarding applications. Thus, preferably, a 6 mil thickness should be used as the minimum thickness that would provide adequate fire retarding properties.

One of the mains applications for the new fire-retardant polyethylene bubble pack according to the invention is in the construction industry. For these applications, the pack comprises a bubbled polyethylene film backed by a flat polyethylene film with aluminum foil backing. Embodiments having this configuration were processed for further testing using the four final candidate compounds identified earlier.

The processing conditions outlined hereinbefore were similarly used to prepare these embodiments. The amount of compound used in each 25 cm×25 cm section under test was 6.0 g i.e. 1.5 g for each 12.5 cm×12.5 cm subsection). The weight ratio of the compound to polyethylene was, thus, 0.5.

Fire tests were conducted on samples each containing mixes 1, 2, 3 and alumina trihydrate. For all samples, two tests were conducted. In the first test, the aluminum foil was exposed to the test flame, while in the second test, the polyethylene bubbles containing each of the compounds were exposed to the test flame for 15 seconds. In some cases, the sample was exposed to the flame for another 15 seconds. One sample (with mix 1) was exposed to the flame for another 30 seconds period.

The sample containing mix 1 was exposed to the flame for a total of 60 seconds (15+15+30 seconds). The sample containing alumina was exposed for a total of 30 seconds (15+15 seconds). It is clear that excellent fire-retarding properties were obtained when the test flame was directed towards the aluminum foil. This excellent fire retardant characteristic was also confirmed for samples that contain mixes 2 and 3. It appears that the aluminum foil acts as a radiation shield and, because of its high thermal conductivity, it also allows for the fast distribution of heat from the flame throughout the sample and thus, reduces the concentration of heat to the exposed area. This result also suggest that better fire resistance of the bubble pack of the invention could be accomplished by increasing the thickness of the aluminum foil.

On the other hand, when polyethylene bubbles are exposed to the test flame, the polyethylene film melted and slowly ignited after 15 seconds of flame exposure. The fire was self-extinguished after 30 seconds from removing the test flame.

The effect of using a relatively large amount of fire retardant chemicals within the polyethylene pack system was investigated. Fire tests were undertaken on bubbled polyethylene sheets of area 12.5 cm×12.5 cm, mass =3 g and containing 50 g of mixes 2 and 3, i.e. mass ratio (chemical/polyethylene) of ~17. After 15 seconds of exposure to a test flame there were no indication of any burns, ignition and/or holes. This suggests that there is some improvement in the fire retarding properties of polyethylene with increasing the amount of fire retarding compound present in the voids.

However, a critical mass ratio appears to exist. Using mass ratios above the critical value appears not to significantly increase the fire retarding properties. For mixes 1, 2 and 3, it appears that there were only slight improvements in fire-retarding characteristics with increasing the amount of fire retarding chemical above a ratio of 1.0 (mass ratios examined=0.5, 1, 8, 17). A mass ratio near 1.0, thus, provides excellent fire retarding properties to the polyethylene bubble pack of the invention Peel Tests and Aging Effects The hereinbefore peel test results on the plain polyethylene material provide a benchmark for comparison of the developed fire retardant systems. Peel tests before and after aging were undertaken on fire retardant packs of the invention. The samples were exposed to and accelerated aging process to simulate aging for twenty years. For these tests, aluminum backed polyethylene was used as the flat film. Conditions used for bonding of the films were 139° C., 30 psi, and 15 seconds. Four different compounds were used: Mix #1 (Antimony Trioxide plus decambromodiphenyl ether); Mix #2 ( Mix #1 plus DC 200 fluid); Alumina trihydrate; and Alumina trihydrate plus DC 200 fluid. A weight ratio of 100% (equal weights of compound and polyethylene) was used in all tests. As a reference, a plain specimen was also prepared and tested for peel strength. Table 4 summarizes the peel tests results before and after aging.

TABLE 4

Peel stength for fire retardant rFOIL systems, before and after aging

| Fire Retardant Compound | Peel Strength (N/m) | Peel Strength After Aging (N/m) |
|---|---|---|
| No Fire Retardant | 730 | 776 |
| Mix 1 | 508 | 547 |
| Mix 1 + DC 200 | 468 | 548 |
| Aluminum trihydrate | 664 | 674 |
| Aluminum Trihydrate + DC 200 | 545 | 519 |

The results show that the peel strength of the plain prototype is similar to that obtained in previous tests (e.g. Table 2) but higher than the peel strength of the specimens with fire retardant compounds. This could be attributed to the existence of some material between the flat surfaces of the bonded films. The differences between the value of the peel strength between the specimens could also attributed to the variation in the amounts of material between the flat surfaces from one sample to the other. The most significant result is that the peel strength was not reduced after the simulated aging process. This confirms that the insertion of the fire retardant compounds within the bubbles of the polyethylene does not have any significant detrimental effect on the aging characteristics of the fire-retardant bubble packs of the invention. This contrast to the existing fire retardant polyethylene films which exhibit a deterioration of their bonding strength within a very short period of time, e.g. 6 months.

Thermal Properties

The thermal R-value of the packs was only slightly lowered when the voids contained fire retardant compounds in the packs according to the present invention.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. An improved bubble pack comprising a first thermoplastic film having a plurality of portions wherein each of said portions defines a cavity; a second film in sealed engagement with said first film to provide a plurality of closed said cavities; a layer of metal or metallized film adjacent at least one of said films; the improvement comprising wherein said cavities contain a fluid or solid fire retardant material.

2. A pack as defined in claim 1 wherein said first and second films are so flexible as to allow said pack to be rolled to define in whole or in part a cylinder.

3. A pack as defined in claim 1 comprising a coplanar array of bubbles having a diameter selected from 0.5 cm–5 cm and a height selected from 0.2 cm–1 cm.

4. A pack as defined in claim 1 wherein said fire retardant is selected from the group consisting of alumina trihydrate (ATH hydrated aluminum oxide, $Al_2O_3.3H_2O$), oxides of antimony, decabromodiphenyl oxide and mixtures, thereof.

5. A pack as defined in claim 4 wherein said fire retardant is in admixture with a dimethyl siloxane.

6. A pack as defined in claim 4 wherein said fire retardant is alumina trihydrate.

7. A pack as defined in claim 1 wherein said bubble pack comprises 0.1–70% W/W fire retardant in relation to the thermoplastic films.

8. A pack as defined in claim 7 wherein said bubble pack comprises 20–50% W/W fire retardant relative to the thermoplastic films.

9. A pack as defined in claim 1 wherein said thermoplastic film is a polyethylene.

10. A method of providing a thermally insulating, flame retardant bubble pack including the step of:

providing an endless, movable conveyor mold having surfaces defining cavities, placing a film of thermoplastics material on the mold, heating the film to a temperature just below a melting temperature thereof, providing a vacuum at each cavity to pull the film into each cavity, providing fire retardant material in each cavity, and melding and bonding a second thermoplastic film to the first film to close the cavities and provide a bubble pack.

11. The method of claim 10, wherein the step of providing fire retardant material includes spraying the material into each of the cavities as the conveyor mold is moving.

12. The method of claim 10, wherein the step of melding and bonding the second film includes heating the second film and pressing it to the first thermoplastic film.

13. The method of claim 10, further scraping excess fire retardant material from the first thermoplastic film prior to the melding and bonding step.

* * * * *